(12) United States Patent
Hu

(10) Patent No.: US 8,577,217 B2
(45) Date of Patent: Nov. 5, 2013

(54) TILT PREVENTING STRUCTURE FOR ELECTROMAGNETIC DRIVING DEVICE

(75) Inventor: Chao Chang Hu, Taoyuan County (TW)

(73) Assignee: TOK Taiwan Corp. (TW)

( * ) Notice: Subject to any disclaimer, the term of this patent is extended or adjusted under 35 U.S.C. 154(b) by 31 days.

(21) Appl. No.: 13/199,860

(22) Filed: Sep. 12, 2011

(65) Prior Publication Data

US 2013/0064535 A1 Mar. 14, 2013

(51) Int. Cl.
*G03B 3/10* (2006.01)
*G02B 7/02* (2006.01)

(52) U.S. Cl.
USPC .......................................... 396/133; 359/824

(58) Field of Classification Search
USPC .................... 396/79, 133, 529; 348/373–376; 359/819, 822–824
See application file for complete search history.

(56) References Cited

U.S. PATENT DOCUMENTS

| | | | | |
|---|---|---|---|---|
| 7,719,779 B2* | 5/2010 | Yamashita | ..................... | 359/824 |
| 7,821,727 B2* | 10/2010 | Shi et al. | ........................ | 359/824 |
| 2007/0097532 A1* | 5/2007 | Kuo et al. | ..................... | 359/823 |
| 2008/0310037 A1* | 12/2008 | Kuo et al. | ..................... | 359/823 |
| 2011/0038066 A1* | 2/2011 | Huang | ........................... | 359/824 |
| 2011/0052170 A1* | 3/2011 | Huang et al. | .................. | 396/133 |

* cited by examiner

Primary Examiner — WB Perkey
Assistant Examiner — Minh Phan

(57) ABSTRACT

A tilt preventing structure for electromagnetic driving device comprises: a casing, a driven object (such as lens module), a guiding mechanism and an electromagnetic driving module. The driven object is received within the casing and is movable along an axial direction. The guiding mechanism is furnished inside the casing and is sleeved with the driven object, so as to guide the driven object to move along the axial direction. The electromagnetic driving module comprises a plurality of magnetic elements mounted on the driven object. The guiding mechanism is made of magnetically susceptible material and is nearby one of the magnetic elements. By means of the magnetic pulling force generated by the nearby magnetic elements, the guiding mechanism is pulled by the force and leans against the driven object, so as to minimize the tilts when the driven object is moving relative to the guiding mechanism.

7 Claims, 6 Drawing Sheets

TILT PREVENTING STRUCTURE FOR ELECTROMAGNETIC DRIVING DEVICE

BACKGROUND OF THE INVENTION

1. Field of the Invention

The present invention relates to a tilt preventing structure for an electromagnetic driving device. The tilt preventing structure comprises a guiding mechanism comprising a magnetically susceptible material and a magnet disposed on a lens assembly. The magnet exerts a magnetic attraction force upon the guiding mechanism to reduce a dynamic tilt of the lens assembly during its movement along the guiding mechanism and thereby enable the lens assembly to move steadily.

2. Description of the Prior Art

Referring to FIG. 1, there is shown an exploded perspective view of a conventional zooming or focusing lens. A mechanical-transmission focusing mechanism 9 for use with a conventional focusing lens employs a high-cost precise driving element 91 (such as a stepper motor, an ultrasonic motor, or a piezoelectric actuator) to function as a power source for driving a support 93 having a lens assembly 92 and employs plenty of transmission elements, thereby resulting in a complicated mechanical structure, an intricate and difficult assembly process, an excessive volume, high costs, excessive power consumption, and a lack of price competitiveness.

In the early stage of the photography art, large human labor has been involved in metering, focusing and winding. Inevitably, it can be foreseen that how sorry would be if meeting a human mistake in taking photos in an important scene. Obviously, a quality photographer is the only answer to ensure photographing during such an important scene. Yet, it is well known that no 100% photographer is available anywhere and anytime. In the 50's and 60's, a great step has been achieved in the mechanical automation, from which people believe that automation would be the key to the future world. At that time, in the photography art, various developments such as the auto-metering device, the electrical winding apparatus and so on, have convinced people that automation is the future to the photography art. Among these developments, the development in the automatic focusing system who ensures the possibility of rapid photo-taking plays an important part.

Along with the technology development, conventional photographic apparatus has been progressed both in photographing quality and in the miniaturized appearance. However, the mechanical focusing lens set driven by the step motor hinders a further reduction in occupation of the apparatus On the other hand, electromagnetic technology has also been introduced to improve the VCM electronic feedback system in monitoring the bias of the coil, which can replace the conventional step motor and provide a size down in the driving mechanism. Another development of the photography art is to add the photographic function to the other apparatus; for example, the integration of the photographic unit to the mobile phone, the PDA, the notebook computer and so on. All these changes make the current electronic merchandises equipped with a photographic unit that enhances a powerful video application to these aforesaid apparatuses.

Nevertheless, the aforesaid mobile phone, PDA, notebook computer, and the like portable electronic apparatus all have limitations in the battery capacity. Therefore, in aiming at the future of the photography art, the devotion upon how to design a low-energy-consumed driving device for focus or zoom lens set and how to anchor the lens set while the power is off is definitely welcome to the skilled person in the art.

Furthermore, all conventional lens driving devices are equipped with a guiding mechanism for guiding a lens to perform linear reciprocating displacement in a predetermined direction. To prevent the lens from getting stuck during its movement or proceeding with jerks and jolts, every conventional guiding mechanism always has an appropriate allowance (i.e., clearance) between its movable part and non-movable part (such as an axle hole and an axle). However, the clearance accounts for a slight quiver or a dynamic tilt that occur to the lens while at rest or in motion. The clearance increases with the tolerance of the axle hole to the detriment of the imaging quality of the lens or the precision in the positioning of the lens in motion. Accordingly, there is still room for improvement in the prior art.

SUMMARY OF INVENTION

It is a primary objective of the present invention to provide a tilt preventing structure for an electromagnetic driving device. The tilt preventing structure comprises a guiding mechanism comprising a magnetically susceptible material and a magnet element disposed on a lens assembly. Magnetic attraction between the guiding mechanism and the magnetic element allows a driven object to abut against the guiding mechanism and further reduces a dynamic tilt of the driven object during its movement along the guiding mechanism.

In order to achieve aforementioned objective, the present invention discloses a tilt preventing structure for an electromagnetic driving device, in which the tilt preventing structure is defined with a central axis. The tilt preventing structure comprising: a casing having a receiving space therein, a driven object received in the receiving space and capable of moving within the casing and along the central axis, a guiding mechanism positioned in the receiving space of the casing and connected to the driven object for guiding the driven object to move along the central axis, and an electromagnetic driving module comprising a plurality of magnetic elements coupled to the driven object. Wherein, the guiding mechanism comprises a magnetically susceptible material and is positioned proximate to at least one of the magnetic elements and corresponds in position thereto, such that an adjacent one of the magnetic element exerts a magnetic attraction force upon the guiding mechanism to cause the driven object to abut against the guiding mechanism and thereby reduce a dynamic tilt occurring to the driven object while the driven object is moving along the guiding mechanism.

In a preferred embodiment, the electromagnetic driving module further comprises a plurality of coils, the coils being disposed on the casing and corresponding in position to the magnetic elements, respectively, and the magnetic elements being magnets.

In a preferred embodiment, the driven object is a lens assembly and comprises a lens support and a lens centrally disposed at the lens support and moving together with the lens support synchronously.

In a preferred embodiment, the tilt preventing structure further comprises a lid for positioning the lens support in the receiving space and confining the coils to the casing, wherein the guiding mechanism comprises a guiding rod.

In a preferred embodiment, the tilt preventing structure further comprises a frictional element disposed at the lens support and abutting against the guiding rod for producing an appropriate frictional force relative to the guiding rod, the frictional force being larger than a weight of the lens assembly.

In a preferred embodiment, the magnetic elements come in threes, attach to the lens support from outside, and correspond in position to three said coils disposed on the casing, respectively.

In a preferred embodiment, the electromagnetic driving module further comprises a lead frame and two conductive terminals, wherein the lead frame and two said conductive terminals are coupled to a top side and an outer side of the casing, respectively, electrically connected by a plurality of wires and the coils, respectively, to form a current loop, and clamped together to be fixed between the lid and the casing by means of the lid.

In a preferred embodiment, the tilt preventing structure further comprises a position sensing module. The position sensing module further comprises a position sensor and a permanent magnet. The position sensor is coupled to the casing, and is corresponding in position to the permanent magnet coupled to an external periphery of the lens assembly, and is electrically connected to the lead frame.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
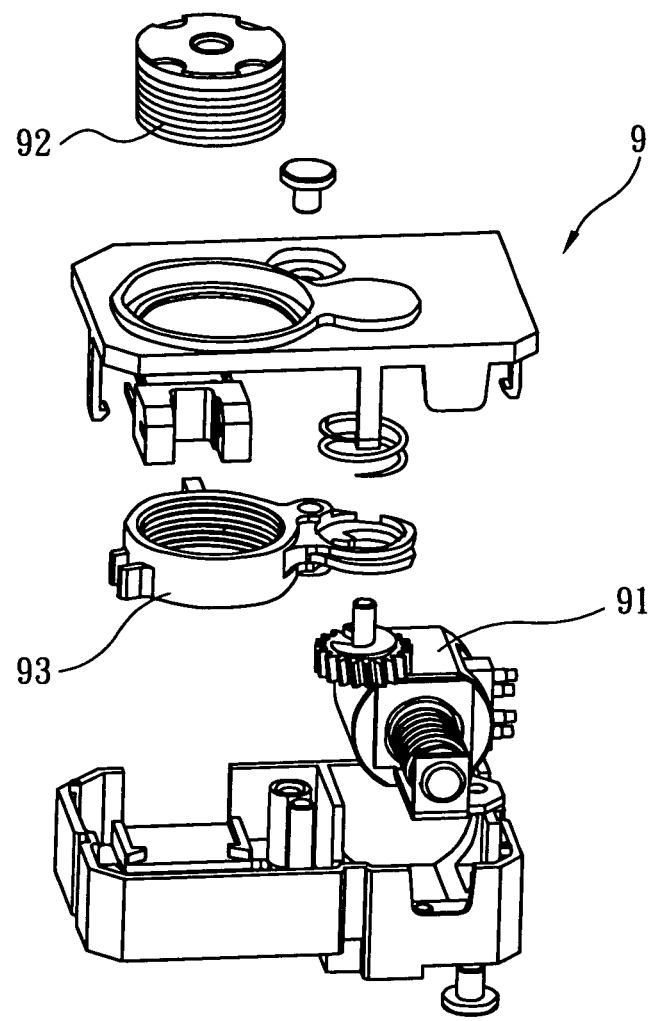
FIG. 1 is an exploded perspective view of a conventional a focusing lens.
Figure 2:
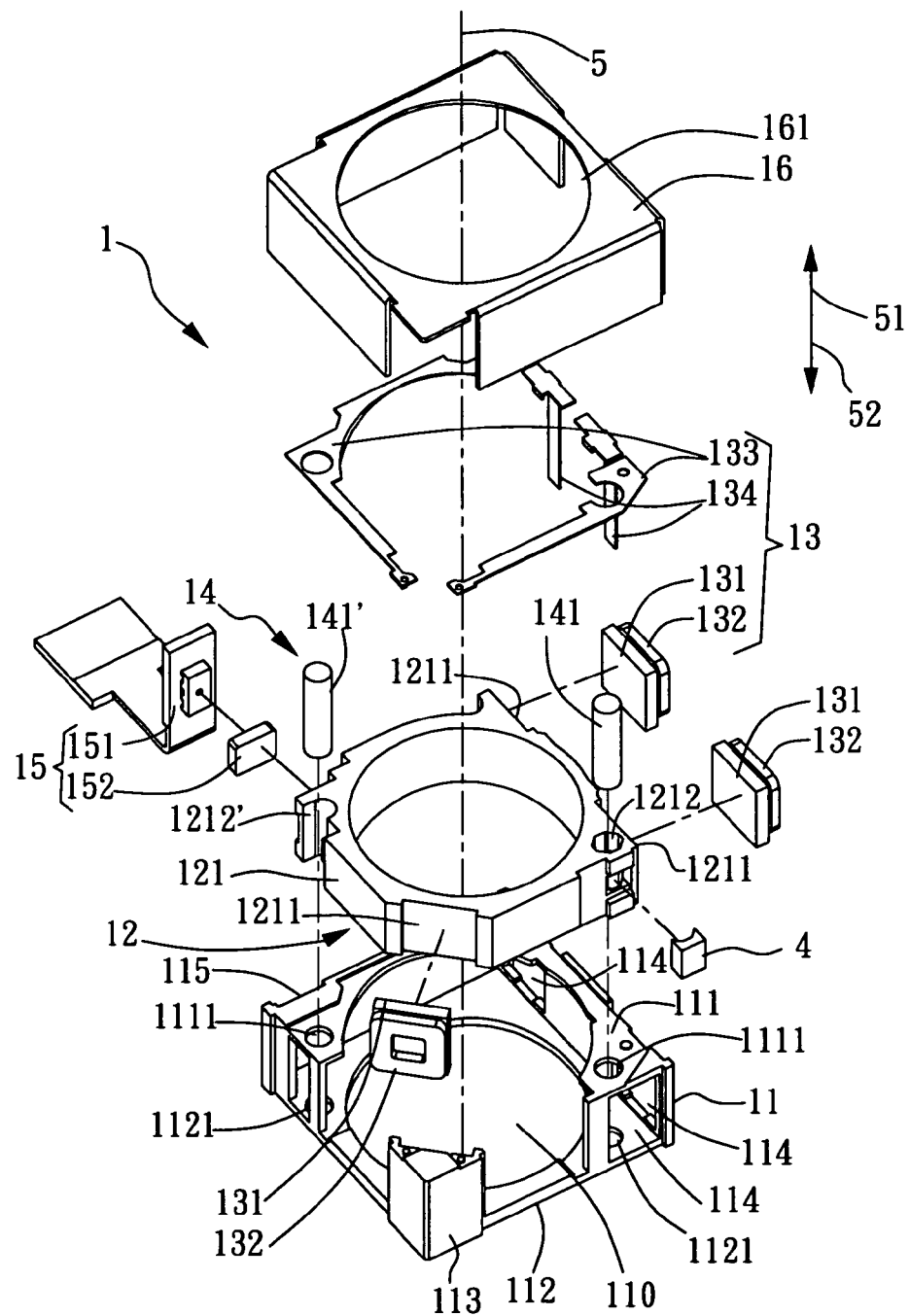
FIG. 2 is an exploded perspective view of a tilt preventing structure for an electromagnetic driving device of the present invention.
Figure 3:
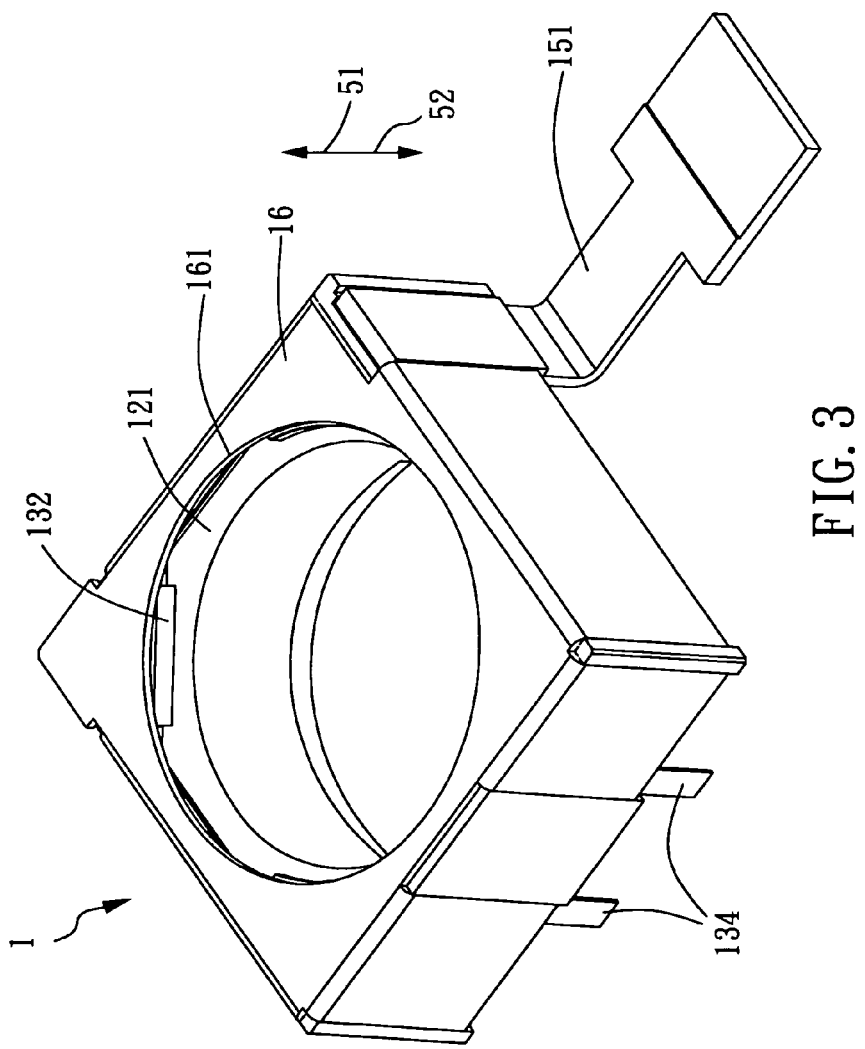
FIG. 3 is an assembled perspective view of a tilt preventing structure for an electromagnetic driving device of the present invention.

Referring to FIG. 2 and FIG. 3, there are shown an exploded perspective view and an assembled perspective view of a tilt preventing structure for an electromagnetic driving device of the present invention, respectively. As shown in FIG. 2, a tilt preventing structure for an electromagnetic driving device 1 is defined with a central axis 5, and the tilt preventing structure for an electromagnetic driving device 1 comprises a casing 11, a driven object (a lens assembly 12), an electromagnetic driving module 13, a guiding mechanism 14, a position sensing module 15, and a lid 16. The central axis 5 is defined with two axial directions, namely a front 51 and a rear 52. The casing 11 is substantially a hollow casing structure that is penetrated and has a receiving space 110 therein. The casing 11 further comprises a top side 111, a bottom side 112, an outer side 113, a plurality of fixing chambers 114, and an engaging chamber 115. In this embodiment, the driven object is the lens assembly 12. The lens assembly 12 further comprises a lens support 121. A plurality of coupling chambers 1211 is disposed at the external periphery of the lens support 121. However, in other embodiments not shown in the drawings, the lens assembly 12 can also be another object comprising a lens and capable of being driven to perform forward and backward linear displacement. The electromagnetic driving module 13 further comprises a plurality of magnetic elements 131, a plurality of coils 132, a lead frame 133, and two conductive terminals 134. The position sensing module 15 further comprises a position sensor 151 and a permanent magnet 152.

The lid 16 is a hollow lid with a through-hole 161 therein. The lid 16 is coupled to the casing 11 so as to cover the casing 11. The lid 16 and the casing 11 can be coupled together to thereby allow the lens assembly 12 to be positioned in the receiving space 110. The fixing chambers 114 are disposed at predetermined positions on the periphery of the casing 11, such that the fixing chambers 114 are engaged with the coils 132, respectively. The lid 16 further confines the coils 132 to the casing 11; meanwhile, the lens assembly 12 in the receiving space 110 can still capture an external image through the through-hole 161.

In a preferred embodiment of the present invention, the magnetic elements 131 come in threes, whereas the coils 132 also come in threes and correspond in position to the magnetic elements 131 respectively. Likewise, it is feasible that the magnetic elements 131 and the coils 132 corresponding thereto come in twos, fours, or any larger numbers. The fixing chambers 114 equal the coils 132 in quantity and are disposed on the outer side 113 of the casing 11. The coils 132 are received in the fixing chambers 114, respectively, communicate with the receiving space 110 of the casing 11, and correspond in position to the magnetic elements 131 in the coupling chambers 1211 at the periphery of the lens support 121, respectively. In this embodiment, the magnetic elements 131 are permanent magnets. At least one of the magnetic elements 131 is positioned proximate to the guiding mechanism 14 and corresponds in position thereto. The guiding mechanism 14 comprises a magnetically susceptible material. Hence, the adjacent one of the magnetic elements 131 exerts a magnetic attraction force F2 upon the guiding mechanism 14 to attract the guiding mechanism 14 (and, in particular, attracts a guiding rod 141 comprising a magnetically susceptible material).

The lens assembly 12 is positioned in the receiving space 110. With the guiding mechanism 14, the middle axis of the lens assembly 12 is aligned with the central axis 5, and the lens assembly 12 performs linear displacement to a certain extent along the central axis 5 but is prevented from rotating. The lens assembly 12 further comprises a lens (not shown) which is coupled to the center of the lens support 121 and moves together with the lens support 121 synchronously. The guiding mechanism 14 is extendible and coupled to within the casing 11. The guiding mechanism 14 enables the lens assembly 12 to perform axial linear motion within the receiving space 110. The guiding mechanism 14 comprises one of a guiding rod or a guiding track. In an embodiment of the present invention, the guiding mechanism 14 comes in the form of two slender guiding rods 141, 141' operating in conjunction with a guiding hole 1212 and a guiding groove 1212', respectively, which are penetratingly disposed at the lens support 121. The guiding mechanism 14 comprising a magnetically susceptible material is manufactured by introducing a magnetically susceptible material, such as yoke powder, into the two guiding rods 141, 141' whose manufacturing process is underway, so as to manufacture the two guiding rods 141, 141' capable of magnetic susceptibility.

In this preferred embodiment as shown in FIG. 2, the guiding mechanism 14 comprises the two guiding rods 141, 141' (and thus hereinafter referring to the guiding mechanism as guiding rods) coupled to the guiding hole 1212 and the guiding groove 1212' on two diagonal corners of the lens support 121. A frictional element 4 is disposed at both or one of the guiding hole 1212 and the guiding groove 1212' of the lens support 121 in a manner that the frictional element 4 has a curved surface that abuts against the guiding rod 141 and/or the guiding rod 141' to thereby produce an appropriate frictional force. The strength of the frictional force depends on the material of which the frictional element 4 is made or the size of the frictional element 4. The upper ends and lower ends of the two guiding rods 141, 141' are fixed to coupling ends 1111, 1121 of the top side 111 and the bottom side 112 of the casing 11, respectively. An axial track corresponding in position to the central axis 5 is formed in the receiving space 110. The axial track enables the lens support 121 to be supported by the two guiding rods 141, 141' through the guiding hole 1212 and the guiding groove 1212'. The lens support 121 is electromagnetically driven by the electromagnetic driving module 13 to move forward and backward linearly and steadily within the receiving space 110 and in the axial direction of the central axis 5 but is prevented from rotating.

Figure 4:
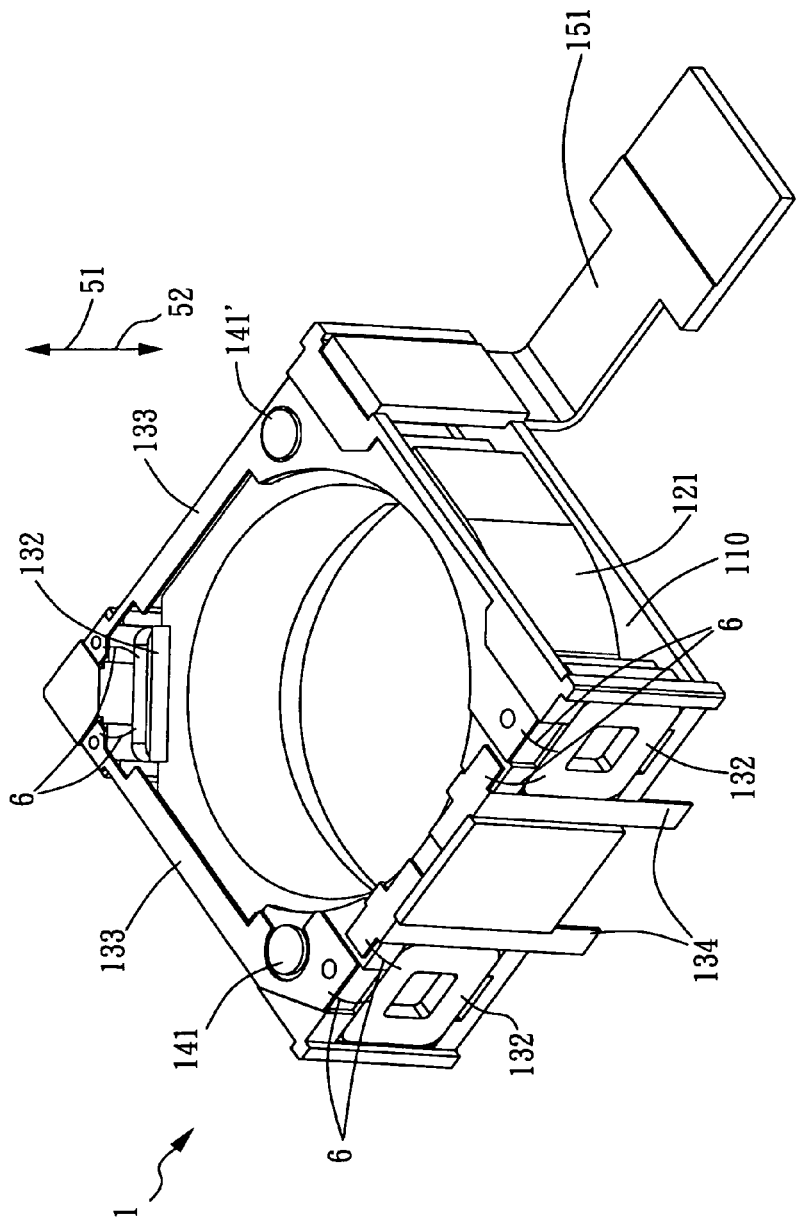
FIG. 4 is an assembled schematic view of a tilt preventing structure for an electromagnetic driving device, without a lid, according to the present invention.

Referring to FIG. 4, there is shown an assembled schematic view of a tilt preventing structure for an electromagnetic driving device, without a lid, according to the present invention. The lead frame 133 and the two conductive terminals 134 are coupled to the top side 111 and the outer side 113 of the casing 11, respectively. The lead frame 133 and the two conductive terminals 134 are electrically connected by a plurality of wires 6 and the coils 132, respectively, to form a current loop. The lead frame 133 and the two conductive terminals 134 are clamped together and thus fixed between the lid 16 and the casing 11 by means of the lid 16.

With the two conductive terminals 134 being connected to the coils 132 and predetermined electrical currents being applied in different directions to produce different magnetic field directions, the magnetic elements 131 are driven to move under the magnetic field. In response to changes in the electrical current and the magnetic field, the lens support 121 can perform axial displacement within the receiving space 110 and in two different directions, that is, moving toward the front 51 or the rear 52 of the central axis 5. As a result, the lens coupled to the lens support 121 is capable of focusing or zooming.

In an embodiment of the present invention, the coils 132 are electrically connected to the two conductive terminals 134 positioned on the outer side 113 of the casing 11, respectively, by means of the wires 6. The two conductive terminals 134 produce an electromagnetic force F1 for driving the lens assembly 12 to move upward as soon as an electrical current is applied to the two conductive terminals 134. As a result, a magnetic force F2 is produced between the guiding rod 141 and the magnetic elements 131. The lens assembly 12 itself produces a gravitational force F3 (i.e., the weight of the lens assembly).

Figure 5A:
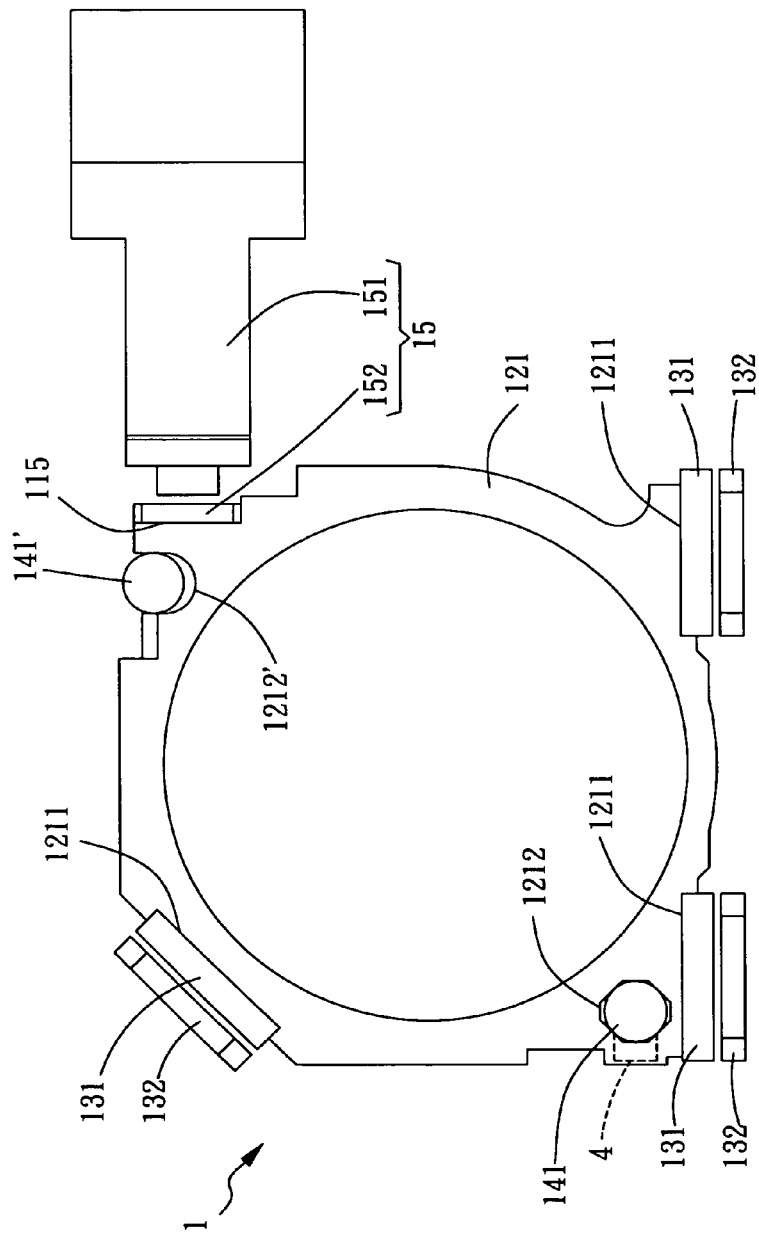
FIG. 5A is a top view of a tilt preventing structure for an electromagnetic driving device, without a lid and a casing, according to the present invention.
Figure 5B:
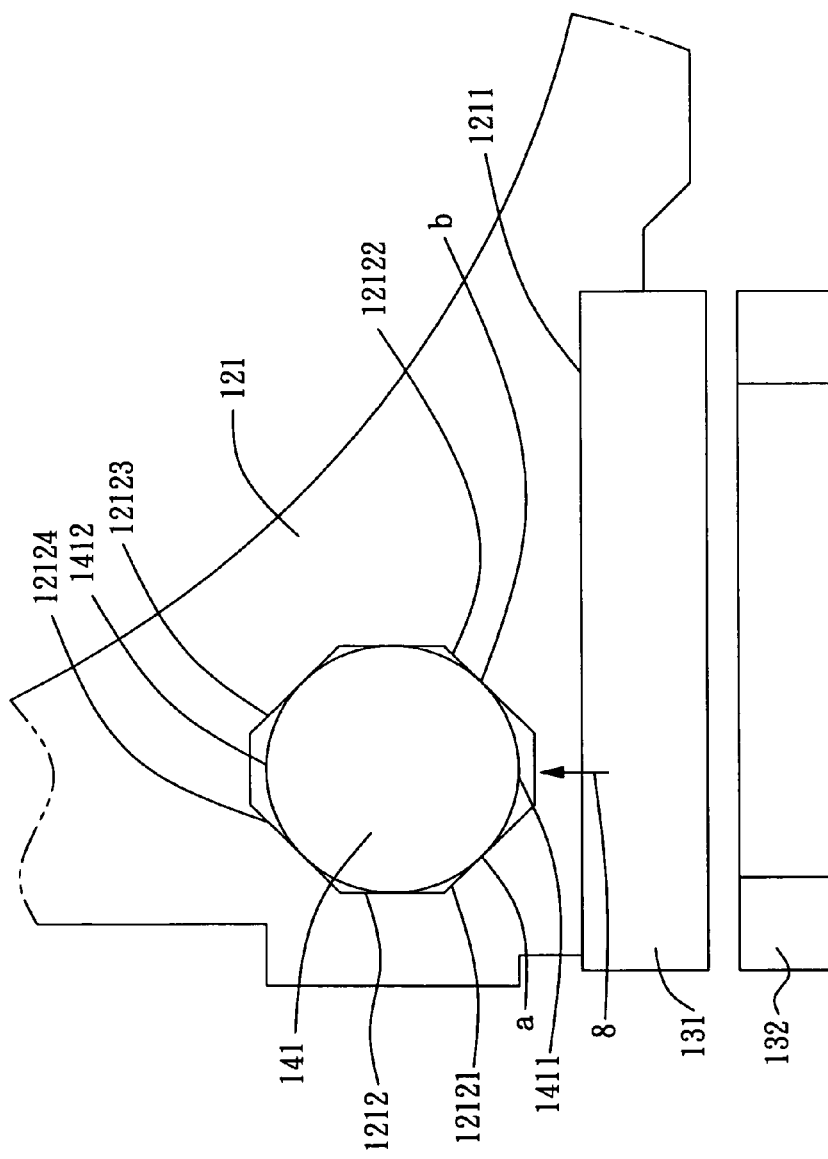
FIG. 5B is a partial enlarged schematic view of a tilt preventing structure for an electromagnetic driving device shown in FIG. 5A according to the present invention.

Referring to FIG. 5A and FIG. 5B, there are shown a top view of a tilt preventing structure for an electromagnetic driving device, without a lid and a casing, according to the present invention, and a partial enlarged schematic view of a tilt preventing structure for an electromagnetic driving device shown in FIG. 5A according to the present invention. In an embodiment of the present invention, the magnetic elements 131 come in threes. One of the magnetic elements 131 is disposed at the corner in the vicinity of the lens support 121 and positioned proximate to the magnetically susceptible material-containing guiding rod 141 so as to correspond in position thereto. Hence, the adjacent one of the magnetic elements 131 exerts a magnetic attraction force F2 upon the guiding rod 141. The magnetic attraction force F2 exerted by the adjacent one of the magnetic elements 131 upon the guiding rod 141 causes the lens support 121 to move in the direction perpendicular to the central axis 5. A clearance allowance necessarily exists between the guiding rod 141 and the guiding hole 1212 and the guiding groove 1212' of the lens support 121 in order to preclude the difficulty in the movement of the lens support 121 relative to the guiding rod 141 because of excessive friction between the lens support 121 and the guiding rod 141. The clearance allowance is a major factor in a slight quiver or a dynamic tilt that occur to the lens support 121 while the lens support 121 is moving relative to the guiding rod 141. Hence, the magnetic attraction force F2 draws the guiding hole 1212 and the guiding groove 1212' closer to the guiding rod 141 and thereby reduces a slight quiver or a dynamic tilt that occur to the lens support 121 while the lens support 121 is in motion.

In this embodiment, to allow the magnetic element 131 positioned proximate to the guiding rod 141 and corresponding in position thereto to produce the magnetic attraction force F2 sufficiently in order to attract the guiding rod 141 and thereby eliminate the clearance allowance and prevent a slight quiver or a dynamic tilt, it is necessary for the shortest distance between the guiding rod 141 and the adjacent magnetic element 131 to be preferably less than 5 mm.

Referring to FIG. 5A and FIG. 5B, in an embodiment of the present invention, the guiding hole 1212 disposed at one of the corners of the lens support 121 and adapted to accommodate the guiding rod 141 comes in the form of a through-hole with a polygonal inner rim, and the open-style guiding groove 1212' opposite to the guiding hole 1212 is disposed at one of the other corners of the lens support 121 for accommodating the guiding rod 141' of the guiding mechanism. The guiding hole 1212 comes in the form of a through-hole with an octagonal inner rim. Normally, in the absence of any other external attractive force, the guiding hole 1212 is evenly spaced apart from the circumference of the cylindrical guiding rod 141 by a clearance allowance conducive to smooth movement of the lens support 121 relative to the two guiding rods 141, 141' through the guiding hole 1212 and the guiding groove 1212'. In an embodiment of the present invention, the clearance allowance is extremely small, such that the imaging effect of the focusing or zooming of the lens assembly 12 remains unabated in the absence of a dynamic tilt.

Due to the aforesaid clearance allowance, the lens support 121 in motion relative to the two guiding rods 141, 141' often quivers slightly—a factor in a dynamic tilt. Hence, the dynamic tilt affects the angle between the lens assembly 12 and an image sensing module corresponding in position to the lens assembly 12. A large tilt angle between the lens assembly 12 and the image sensing module is likely to cause poor optical (imaging) performance. In case of a high pixel requirement, the deviation of angle between the lens assembly 12 and the image sensing module must be less than 10' (1°=60') in order to meet the high pixel requirement. However, according to the prior art, a dynamic tilt angle usually approximates to 10' (i.e., 0.167°). In view of this, with the tilt preventing structure for an electromagnetic driving device of the present invention, the dynamic tilt angle between the lens assembly 12 in motion and the image sensing module is reduced to less than 6' (i.e., 0.1°) so as to minimize the adverse effect of a dynamic tilt on imaging and further enable the image sensing module to capture better images.

As described earlier, one of the three magnetic elements 131 fixedly disposed in the coupling chambers 1211 at the external periphery of the lens support 121, respectively, is positioned proximate to the magnetically susceptible guiding rod 141 and correspond in position thereto, and the magnetic element 131 also corresponds in position to one of the coils 132. For the aforesaid two reasons, in the absence of any power applied to the coils 132, the guiding hole 1212 of the lens support 121 is driven to move in a first direction 8 perpendicular to the central axis 5 under the magnetic attraction force F2 and is eventually attached to a semi-side 1411 of the guiding rod 141, such that the lens support 121 performs a slight displacement to thereby abut against the guiding rod 141. In an embodiment of the present invention, after the guiding hole 1212 with an octagonal inner rim has been subjected to the magnetic attraction force F2, two inner sides 12121, 12122 (that is, two inner sides in the vicinity of the magnetic element 131) of the guiding hole 1212 abut against the semi-side 1411 of the guiding rod 141, such that the two inner sides 12121, 12122 come into contact with the semi-side 1411 of the guiding rod 141 at linear contact points a, b on the semi-side 1411, respectively, for enhancing the stability of the movement of the lens support 121. By contrast, after the guiding hole 1212 with an octagonal inner rim has been subjected to the magnetic attraction force F2, two other inner sides 12123, 12124 (opposite to the two inner sides 12121, 12122) of the guiding hole 1212 are not in contact with another semi-side 1412 of the guiding rod 141 but have a clearance allowance larger than the average clearance allowance. Furthermore, the open-style guiding groove 1212' and the guiding rod 141' together prevent the lens support 121 from deviating in a direction perpendicular to the first direction 8. With the magnetic elements 131 being driven by the plurality of coils 132, respectively, the lens support 121 is capable of performing axial motion along the central axis 5. As a result, after the guiding rods 141, 141' of the guiding mechanism have provided support for the lens support 121, the dynamic tilt that might otherwise occur to the lens support 121 in motion is greatly reduced.

To keep the lens assembly 12 stationary under the frictional force between the frictional element 4 and the guiding rod 141 of the guiding mechanism in the absence of any power applied to the coils 132, it is necessary for the frictional force in the axial direction to be larger than the weight of the lens assembly 12. To enable the powered coils 132 to drive the lens assembly 12 to move, it is necessary for the electromagnetic force F1 of the lens assembly 12 to be larger than the sum of the frictional force and the gravitational force F3 of the lens assembly 13. The electromagnetic force F1 is adjustable, depending on the magnetic strength of the magnetic elements 131 and the number of turns of the coils 132.

Hence, the tilt preventing structure for an electromagnetic driving device 1 of the present invention not only enables the coils 132 to generate the electromagnetic force F1 in different directions for moving the magnetic elements 131 corresponding in position thereto when the two conductive terminals 134 apply a predetermined electrical current in different directions to the coils 132, but also enables the lens support 121 to perform axial displacement in a predetermined direction within the receiving space 110. The magnetic attraction force F2 between the guiding rod 141 and the magnetic elements 131 causes the guiding hole 1212 of the lens assembly 12 to abut against the guiding rod 141 and there by enhances the stability of movement of the lens assembly 12 within the receiving space 110 while the guiding hole 1212 of the lens assembly 12 abuts against the guiding rod 141. As a result, the dynamic tilt angle between the lens assembly 12 and the image sensing module corresponding in position thereto is less than 6', thereby restricting the tilt arising from motion and enhancing optical imaging. In addition, with the electromagnetic force F1 being larger than the sum of the frictional force between the guiding rod 141 and the frictional element 4 and the gravitational force F3 of the lens assembly 12, the lens assembly 12 can perform displacement and zooming along the central axis 5 and toward the front 51 or the rear 52 under the electromagnetic force F1 and the auxiliary guidance provided by the guiding mechanism 14.

The electromagnetic force F1 stops providing a magnetic field as soon as electrical current is no longer supplied to the coils 132. Since the frictional force between the guiding rod 141 and the frictional element 4 is larger than the gravitational force F3 of the lens assembly 12, electrical supply to the coils 132 can be suspended immediately after focusing or zooming is done. The lens assembly 12 is fixed in place by the frictional force, and thus the lens assembly 12 is stationary, thereby manifesting a power saving effect by power suspension and positioning.

In another embodiment, it is also feasible that the tilt preventing structure for an electromagnetic driving device 1 of the present invention dispenses with the frictional element 4. Although a lack of the frictional element 4 prevents the tilt preventing structure for an electromagnetic driving device 1 of the present invention from providing the functionality of power suspension and positioning, it saves the power which will otherwise be required to power the coils 132 and drive the lens support 121 to move.

The position sensing module 15 senses and calculates the position of the lens assembly 12 relative to the casing 11. The position sensor 151 is coupled to the outer side 113 of the casing 11, positioned in the engaging chamber 115, adapted to correspond in position to the permanent magnet 152 coupled to a predetermined position at the external periphery of the lens assembly 12, and adapted to sense the displacement of the lens assembly 12 within the receiving space 110 of the casing 11. The position sensor 151 can be electrically connected to the lead frame 133 for effectuating connection with an external control circuit.

What is claimed is:

1. A tilt preventing structure for an electromagnetic driving device, the tilt preventing structure being defined with a central axis, the tilt preventing structure comprising:
a casing having a receiving space therein;
a driven object received in the receiving space and capable of moving within the casing and along the central axis, further including a guiding hole located at one corner thereof and a guiding groove located at another corner thereof opposing diagonally to the guiding hole;
a guiding mechanism positioned in the receiving space of the casing and connected to the driven object for guiding the driven object to move along the central axis, further including two guiding rods coupled to the guiding hole and the guiding groove; and
an electromagnetic driving module comprising three magnetic elements coupled to the driven object, each of the three magnetic elements being attached to a corresponding corner of the driven object from outside and located in position to one of three coils disposed on the casing, respectively;
wherein the another corner of the driven object is a corner not having any of the three magnetic elements to be mounted thereon;
wherein the guiding rod accommodated in the guiding hole comprises a magnetically susceptible material and is positioned proximate to a middle one of the three magnetic elements by a shortest distance less than 5 mm, such that the middle one of the three magnetic elements exerts a magnetic attraction force upon the guiding rod accommodated in the guiding hole to cause the driven object to abut against the guiding rod and thereby reduce a dynamic tilt occurring to the driven object while the driven object is moving along the guiding mechanism.

2. The tilt preventing structure for an electromagnetic driving device of claim 1, wherein the driven object is a lens assembly and comprises a lens support and a lens centrally disposed at the lens support and moving together with the lens support synchronously.

3. The tilt preventing structure for an electromagnetic driving device of claim 2, further comprising a lid for positioning the lens support in the receiving space and confining the coils to the casing.

4. The tilt preventing structure for an electromagnetic driving device of claim 3, further comprising a frictional element disposed at the lens support and abutting against the guiding rod for producing an appropriate frictional force relative to the guiding rod, the frictional force being larger than a weight of the lens assembly.

5. The tilt preventing structure for an electromagnetic driving device of claim 3, wherein the electromagnetic driving module further comprises a lead frame and two conductive terminals, wherein the lead frame and two said conductive terminals are coupled to a top side and an outer side of the casing, respectively, electrically connected by a plurality of wires and the coils, respectively, to form a current loop, and clamped together to be fixed between the lid and the casing by means of the lid.

6. The tilt preventing structure for an electromagnetic driving device of claim 5, further comprising a position sensing module, the position sensing module further comprising a position sensor and a permanent magnet, the position sensor being coupled to the casing, corresponding in position to the permanent magnet coupled to an external periphery of the lens assembly, and electrically connected to the lead frame.

7. The tilt preventing structure for an electromagnetic driving device of claim 1, wherein the guiding hole is in the form of a through-hole with an octagonal inner rim.

* * * * *